(12) United States Patent
Johannes et al.

(10) Patent No.: US 6,312,030 B1
(45) Date of Patent: Nov. 6, 2001

(54) FOOD MANIPULATING TOOL

(75) Inventors: Marty Johannes, Dover Plains, NY (US); Timothy P. King, P.O. Box 498, Pine Plains, NY (US) 12567

(73) Assignee: Timothy P. King, Pine Plains, NY (US)

( * ) Notice: Subject to any disclaimer, the term of this patent is extended or adjusted under 35 U.S.C. 154(b) by 0 days.

(21) Appl. No.: 09/312,685

(22) Filed: May 14, 1999

(51) Int. Cl.[7] .................................................. A47J 43/28
(52) U.S. Cl. ............................................................. 294/26
(58) Field of Search ............................... 294/1.1, 5, 19.3, 294/26, 55.5, 61; 30/322, 340; 99/419, 421 A; D7/653, 683, 688

(56) References Cited

U.S. PATENT DOCUMENTS

| | | | |
|---|---|---|---|
| D. 330,492 | * | 10/1992 | Brown ................................. 294/26 X |
| D. 332,554 | * | 1/1993 | Gomez et al. ...................... 294/26 X |
| 867,886 | * | 10/1907 | Kriner ...................................... 294/26 |
| 1,542,503 | * | 6/1925 | Haidle ...................................... 294/26 |
| 2,461,941 | * | 2/1949 | Sutton ...................................... 294/26 |
| 2,604,350 | * | 7/1952 | Taylor ...................................... 294/26 |
| 2,727,777 | * | 12/1955 | Johnstone et al. ...................... 294/26 |
| 4,168,856 | | 9/1979 | Rhoades ............................. 294/26 X |
| 5,056,841 | * | 10/1991 | Yong ...................................... 294/1.1 |
| 5,896,668 | * | 4/1999 | Murrell ............................. 294/26 X |

FOREIGN PATENT DOCUMENTS

2239786 * 7/1991 (GB) ....................................... 294/26

* cited by examiner

Primary Examiner—Johnny D. Cherry
(74) Attorney, Agent, or Firm—Fulbright & Jaworski, LLP

(57) ABSTRACT

This invention discloses a food manipulating tool for indoor and outdoor use, that allows the user to skeweringly hook and relocate, or skeweringly hook and turn and/or flip food on a cooking surface. This invention also discloses several methods for using this tool so as to optimize its functions.

2 Claims, 2 Drawing Sheets

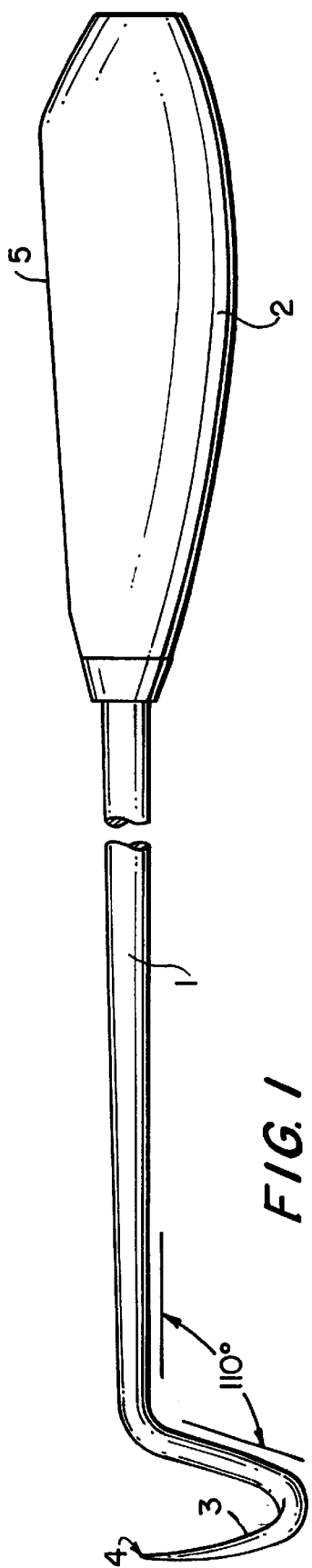
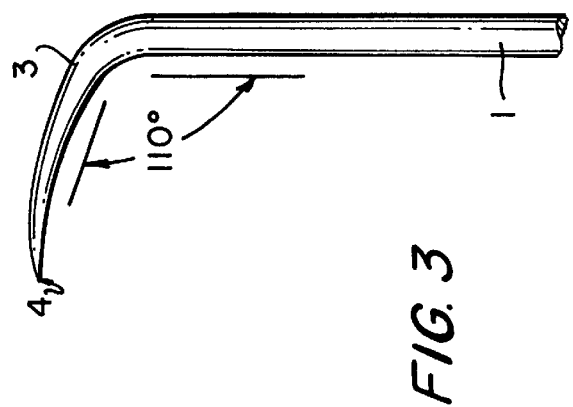
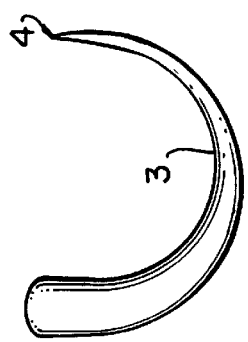
FIG. 1
FIG. 3
FIG. 2

FOOD MANIPULATING TOOL

BACKGROUND

The present invention is directed to a food manipulating tool for indoor and outdoor use and to methods of employing the tool.

Food turning and manipulating tools, such as forks, spatulas, tongs and skewers have been in use, in various forms, for centuries around the world. A review of the art suggests that there have been few material improvements in devices designed to penetrate, lift and/or turn solid foods while cooking. A rare example of an improvement to the art is Rhoades U.S. Pat. No. 4,168,856, which discloses a meat manipulating tool having a hook and a turner plate. However, as can be seen, the Rhoades improvements are not capable of the functions of the present invention. It appears that no worker in the field has previously created a device that allows the user to penetratingly, skewer, hook, lift and/or turn and flip the food in a single, continuous, bi-axial thrusting and turning motion of the user's hand, wrist and arm.

SUMMARY

The present invention is related to a food manipulating tool and methods for its employment. Other embodiments of the present invention are further described hereinbelow.

BRIEF DESCRIPTION OF THE DRAWINGS

FIG. 1 is a plan view of the food manipulating tool.

FIG. 2 is an end view thereof, showing the hook end.

FIG. 3 is a side view of the shaft and hook.

DESCRIPTION

Figure 4:
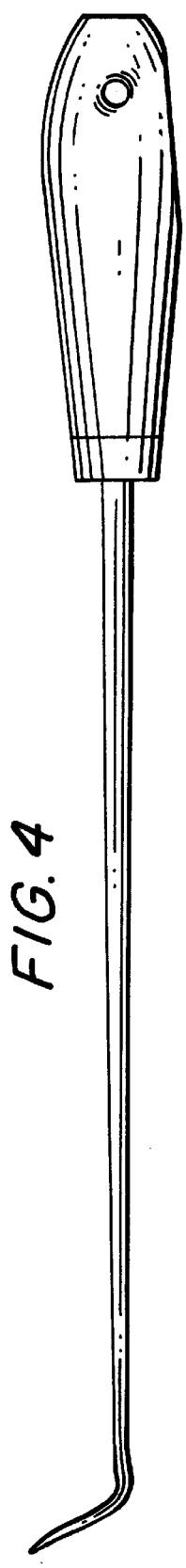
FIG. 4 is a side view of the food manipulating tool with the flattened handle portion positioned downwardly.
Figure 5:
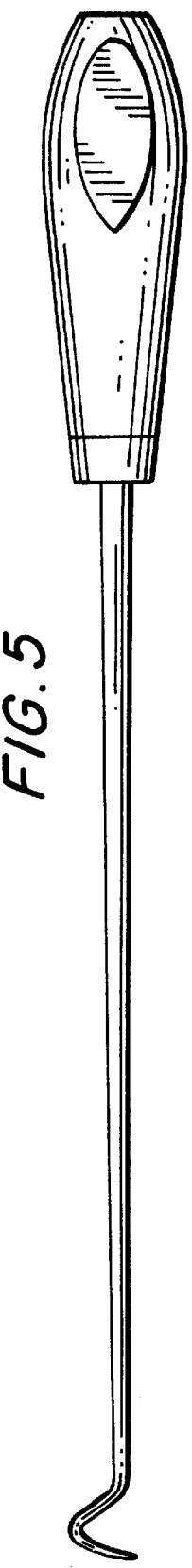
FIG. 5 is a top view of the food manipulating tool with the flattened handle portion facing upward.
Figure 6:
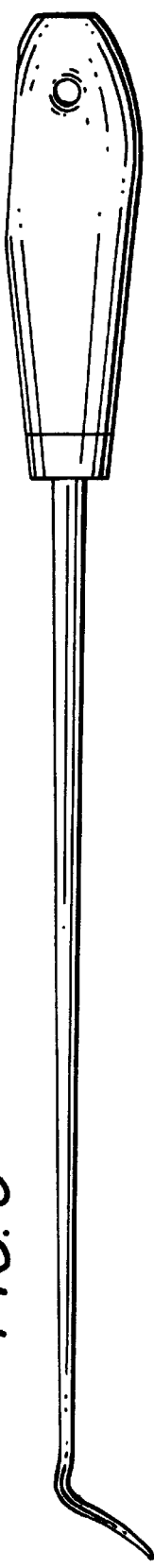
FIG. 6 is a side view of the food manipulating tool oriented as shown in FIG. 5.
Figure 7:
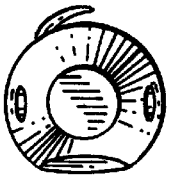
FIG. 7 is an end view of the food manipulating tool from the handle end.

The food manipulating tool of the present invention comprises a shaft 1 having a handle 2 at one end. Laterally extending from the other end of the shaft is a hook 3. As shown in FIG. 1 and FIG. 3, the hook 3 is offset at 110 degrees from the shaft. As shown in FIG. 2, the hook 3 curves to form a semicircle, terminating in a point 4.

In the preferred embodiment, the shaft 1 is continuously tapered beginning from its handle-end and continuing to its hook-end. Preferably the tapering of the shaft 1 is from about 0.375 inches to about 0.185 inches. The length of the shaft is varied to best suit different cooking apparatuses. For example, the shaft is preferably about 6 inches long for flipping bacon in an 8 inch, stove top skillet; or about 18 inches long for turning food in a deep, enclosed salamander type commercial broiler. The relative dimensions of the tool of the present invention can be modified in similar proportion to those of the preferred embodiment. The shaft 1 is preferably hollow, to make the tool light in the hand. The essentially, round handle 2 preferably has a flat surface 5, to aid in orienting the tool correctly in the user's hand.

Further, in the preferred embodiment the hook 3 is also continuously tapered, with the tapering terminating in point 4. The tapering of the hook 3 is preferably from about 0.185 to about 0.025 inches and the radius of the hook 3 is preferably about 0.40 inches.

The point 4 and taper of the hook 3 are of such narrow dimension as to make a very small penetration in the food. The small diameter of the puncture minimizes distortion in the appearance of the food. Also, in foods that have fluids or juices, such as in meats, the small diameter of the puncture made by the sharp point 4 of the hook 3 minimizes the loss of these desirable fluids. With foods that have been coated with a sauce, have been dipped in a batter or coated with bread crumbs, the small diameter of the hook's point minimizes the disturbance or displacement of such food coatings as compared to a fork, set of tongs or a spatula.

As those skilled in the art will appreciate, the cooking surface of a grill or griddle frequently accumulates residue from foods previously cooked on it. Turning or flipping a food with a spatula or tongs scrapes that residue off the cooking surface and onto the food being cooked. The present invention allows one to manipulate the food without contacting the cooking surface, thereby reducing the likelihood that any residue will adhere to the food being cooked.

The food manipulating tool of the present invention can be implemented with a variety of foods both in outdoor use, such as on a barbecue and in indoor use, such as on the stove top, broiler, or salamander grill. The 110 degree offset of the hook 3 allows the user to thrust and rotate the tool clockwise, thereby insuring that the food is thoroughly penetrated and engaged. The continuous tapering shape of the preferred embodiment of the tool provides for optimum balance and maneuverability.

To turn the food, the user may use the tool of the present invention to either a) penetratingly skewer the food, pick it up from the cooking surface, and lay it over on one side to be cooked, or b) penetratingly skewer the food and continue to rotate the tool in a clockwise motion so that the food rolls over the outside, convex radius of the hook and is flipped clockwise until the surface to be cooked comes into contact with the cooking surface.

The radius and sharpness of the hook's point also allows the user to lift and move a food from location to location on, or within, a cooking apparatus (e.g. griddle, frying pan, enclosed salamander type grill, or conventional, outdoor barbecue type grill). This facility also allows for the carrying of a food from a plate to a cooking apparatus and vice versa.

When the tool is held with the open face of the hook pointing toward the edge of the food to be turned, the tool can be manipulated to quickly turn or flip the food without penetration. This is accomplished by positioning the open radius of the hook to encircle one edge of the food to be turned. Subsequently, a counter-clockwise arcing motion of the tool from tie engaged edge of the food toward the opposite non-engaged edge of the food will turn or flip the food without the hook's point ever penetrating the food.

The methods of use described above optimize the multiple functions of the tool. The tool's design, combined with the above described methods of use, dramatically increase the speed with which the user can manipulate a multitude of food items.

It will be understood that this specification is illustrative of the present invention and that other embodiments within the spirit and scope of the invention will suggest themselves to those skilled in the art. All references cited herein are incorporated by reference.

What is claimed is:

1. A food manipulating tool comprising:

a shaft having a handle end and a hook end that ends with a point, the shaft having a longitudinal axis and continually tapering from the handle end to the point; and a substantially rounded handle affixed to said handle end of said shaft, said handle having a flattened portion along a longitudinal plane thereof and parallel to said shaft;

wherein the hook end of said shaft is formed as curved hook that begins at a bend in the shaft and ends at a point, the bend in the shaft being 110° when measured along the longitudinal axis of the shaft, the flattened portion of said handle aligned opposite said point.

2. A food manipulating tool of claim, 1, wherein the shaft is hollow.

* * * * *